US012307867B2

United States Patent
Ellers et al.

(10) Patent No.: US 12,307,867 B2
(45) Date of Patent: *May 20, 2025

(54) HARD TAG APPLICATOR

(71) Applicant: Sensormatic Electronics, LLC, Boca Raton, FL (US)

(72) Inventors: Edward Paul Ellers, Boca Raton, FL (US); Patrick Claeys, Weston, FL (US); Channing Everet Miller, Fort Lauderdale, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,345

(22) Filed: Jun. 26, 2023

(65) Prior Publication Data

US 2023/0334969 A1 Oct. 19, 2023

Related U.S. Application Data

(63) Continuation of application No. 17/484,698, filed on Sep. 24, 2021, now Pat. No. 11,721,188, which is a
(Continued)

(51) Int. Cl.
*G08B 13/24* (2006.01)
*E05B 73/00* (2006.01)
(Continued)

(52) U.S. Cl.
CPC ...... *G08B 13/2434* (2013.01); *E05B 73/0017* (2013.01); *F16B 21/00* (2013.01);
(Continued)

(58) Field of Classification Search
CPC . G08B 13/2434; E05B 73/0017; F16B 21/00; G06Q 10/087; B62H 5/00; B65D 2203/10; B65D 2211/00
See application file for complete search history.

(56) References Cited

U.S. PATENT DOCUMENTS

| 7,383,864 B2 | 6/2008 | Hogerton et al. |
| 7,789,280 B1 | 9/2010 | Gouelibo et al. |

(Continued)

FOREIGN PATENT DOCUMENTS

| CN | 101180219 A | 5/2008 |
| CN | 201153000 Y | 11/2008 |

(Continued)

OTHER PUBLICATIONS

International Search Report and Written Opinion dated Apr. 1, 2019 issued in PCT/US2018/065762.

*Primary Examiner* — Seung H Lee
(74) *Attorney, Agent, or Firm* — ArentFox Schiff LLP

(57) ABSTRACT

Systems and methods for coupling a tag to an item. The methods comprise: dispensing the tag from a tag feeder of a tag applicator; performing first operations by the tag applicator to mechanically move the tag into a nest of the tag applicator; determining if a given criteria is met based on feedback information received from at least one of a user of the tag applicator and a sensor provided with the tag applicator; and performing second operations by the tag applicator to couple the tag to the item, when a determination is made that the given criteria is met.

19 Claims, 16 Drawing Sheets

Related U.S. Application Data continuation of application No. 16/900,604, filed on Jun. 12, 2020, now Pat. No. 11,138,850, which is a continuation of application No. 16/220,961, filed on Dec. 14, 2018, now Pat. No. 10,720,036.

(60) Provisional application No. 62/599,062, filed on Dec. 15, 2017.

(51) Int. Cl.
*F16B 21/00* (2006.01)
*G06Q 10/087* (2023.01)
*B62H 5/00* (2006.01)

(52) U.S. Cl.
CPC ............ *G06Q 10/087* (2013.01); *B62H 5/00* (2013.01); *B65D 2203/10* (2013.01); *B65D 2211/00* (2013.01)

(56) References Cited

U.S. PATENT DOCUMENTS

| | | |
|---|---|---|
| 8,154,406 B2 | 4/2012 | Feldenzer et al. |
| 8,186,409 B2 | 5/2012 | Shao et al. |
| 2005/0155213 A1 | 7/2005 | Eastin |
| 2005/0190060 A1 | 9/2005 | Clancy et al. |
| 2010/0214080 A1 | 8/2010 | Alexis |
| 2010/0307688 A1 | 12/2010 | Shao et al. |
| 2013/0321155 A1 | 12/2013 | Nguyen |
| 2018/0291652 A1* | 10/2018 | Piccoli .................. E05B 19/26 |

FOREIGN PATENT DOCUMENTS

| | | |
|---|---|---|
| CN | 101960083 A | 1/2011 |
| CN | 103843042 A | 6/2014 |

\* cited by examiner

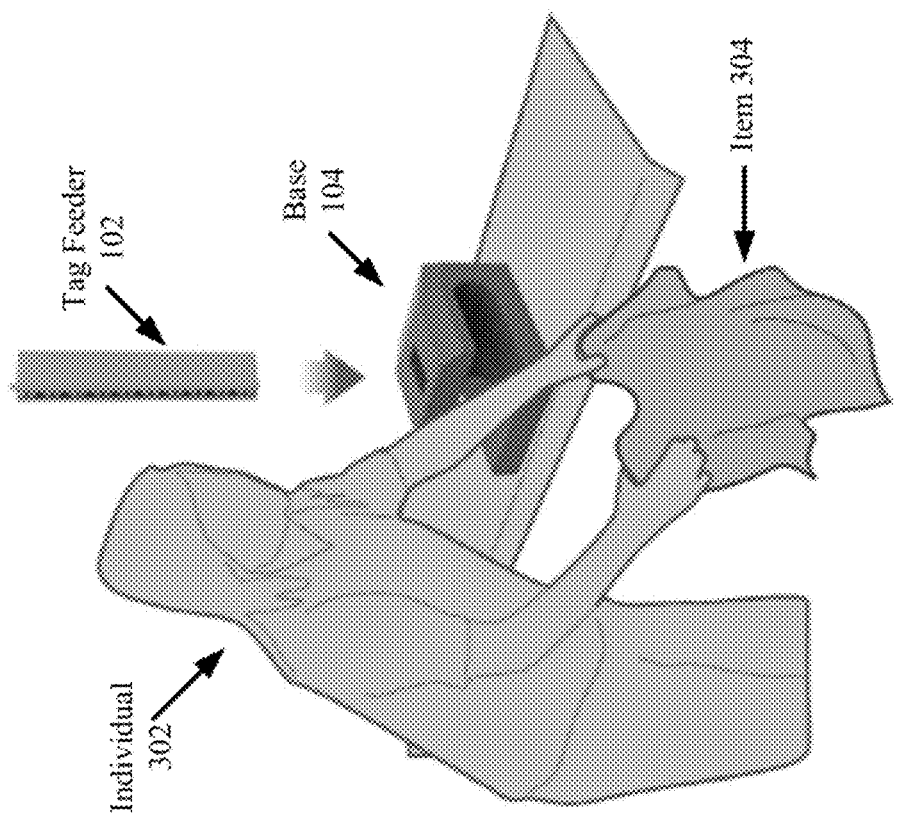
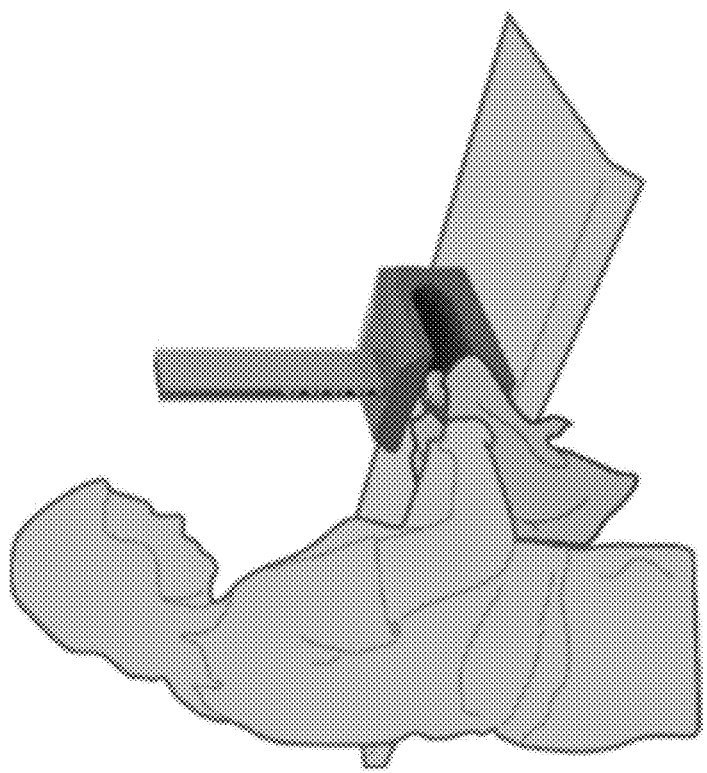
FIG. 3
FIG. 4

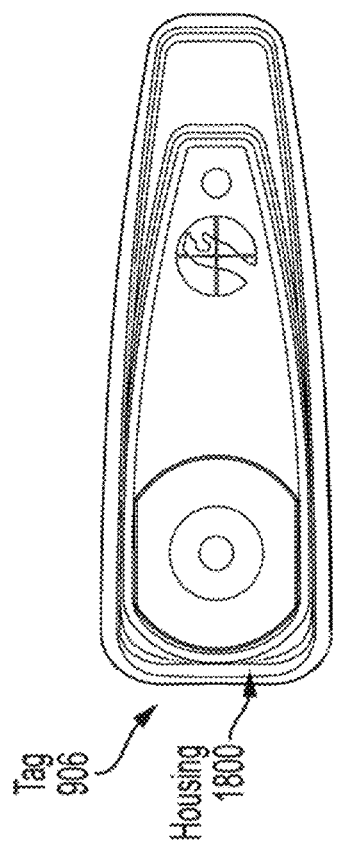
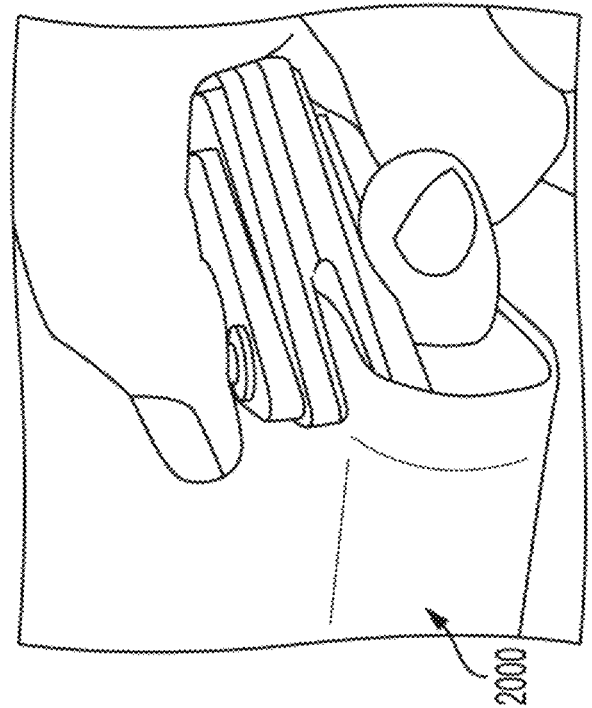
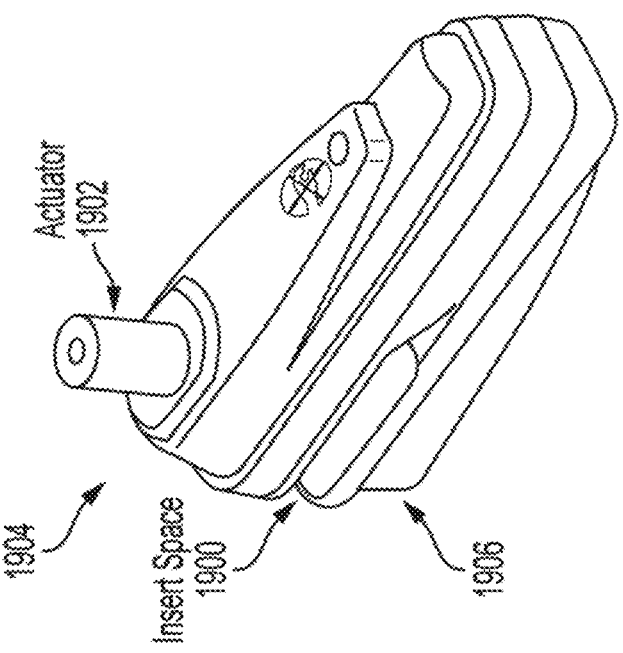

HARD TAG APPLICATOR

CROSS-REFERENCE TO RELATED APPLICATIONS

This application is a continuation of U.S. application Ser. No. 17/484,698 filed Sep. 24, 2021, which is a continuation of U.S. application Ser. No. 16/900,604 filed Jun. 12, 2020, which is a continuation of U.S. application Ser. No. 16/220,961 filed Dec. 14, 2018, which claims the benefit of U.S. Application No. 62/599,062 which was filed on Dec. 15, 2017, the disclosures of which are hereby incorporated by reference.

BACKGROUND

Statement of the Technical Field

The present disclosure relates generally to tag applicators. More particularly, the present disclosure relates to implementing systems and methods for applying tags to items, objects and/or merchandise.

DESCRIPTION OF THE RELATED ART

In Electronic Article Surveillance ("EAS") systems, security tags are coupled to items, objects and/or merchandise for protecting the same from theft and/or inventorying purposes. Current solutions for tagging items/objects/merchandise involve: manually holding an EAS security tag body in one hand while holding a retaining pin in the other hand; and inserting the retaining pin through the item/object/merchandise and into the EAS security tag body located on the other side of the merchandise.

SUMMARY

The disclosure concerns systems and methods for coupling a tag to an item. The methods comprise: dispensing the tag from a tag feeder of a tag applicator; performing first operations by the tag applicator to mechanically move the tag into a nest of the tag applicator; determining if a given criteria is met based on feedback information received from at least one of a user of the tag applicator and a sensor provided with the tag applicator; and performing second operations by the tag applicator to couple the tag to the item, when a determination is made that the given criteria is met.

In some scenarios, the tag is dispensed from the tag feeder by: causing the tag disposed in the tag feeder to become aligned with a cavity formed in a base of the tag applicator; and allowing the tag to travel out of the tag feeder and into the cavity as a result of gravitational force being applied to the tag. The tag's alignment with the cavity may be achieved by rotating the tag feeder in a clockwise or counterclockwise direction (e.g., in cases where the tag feeder comprises a rotary cartridge).

In those or other scenarios, the movement of the tag is in one-dimension along a first straight line. The second operations comprise moving a plunger in one-direction along a second straight line that is perpendicular to the first straight line.

In those or other scenarios, the methods also comprise: causing the tag to rotate a certain amount while being mechanically moved towards the nest; and/or preventing reverse movement of the tag towards the tag feeder subsequent to when the tag rests in the nest. A portion of the tag slides against a curved surface of a guide which causes the tag's rotation by the certain amount.

In those or yet other scenarios, the feedback information includes, but is not limited to, information indicating whether the tag is properly disposed in the nest of the tag applicator, and/or information indicating whether an item is properly located in an insert space of the tag applicator. A user of the tag applicator may be notified when a determination is made that the given criteria is not met.

BRIEF DESCRIPTION OF THE DRAWINGS

The present solution will be described with reference to the following drawing figures, in which like numerals represent like items throughout the figures.

FIGS. 3-4 provide illustrations that are useful for understanding how a tag is attached to an item using the tag applicator of FIG. 1.

FIGS. 18-20 provide illustrations of an illustrative tag.

DETAILED DESCRIPTION

Figure 1:
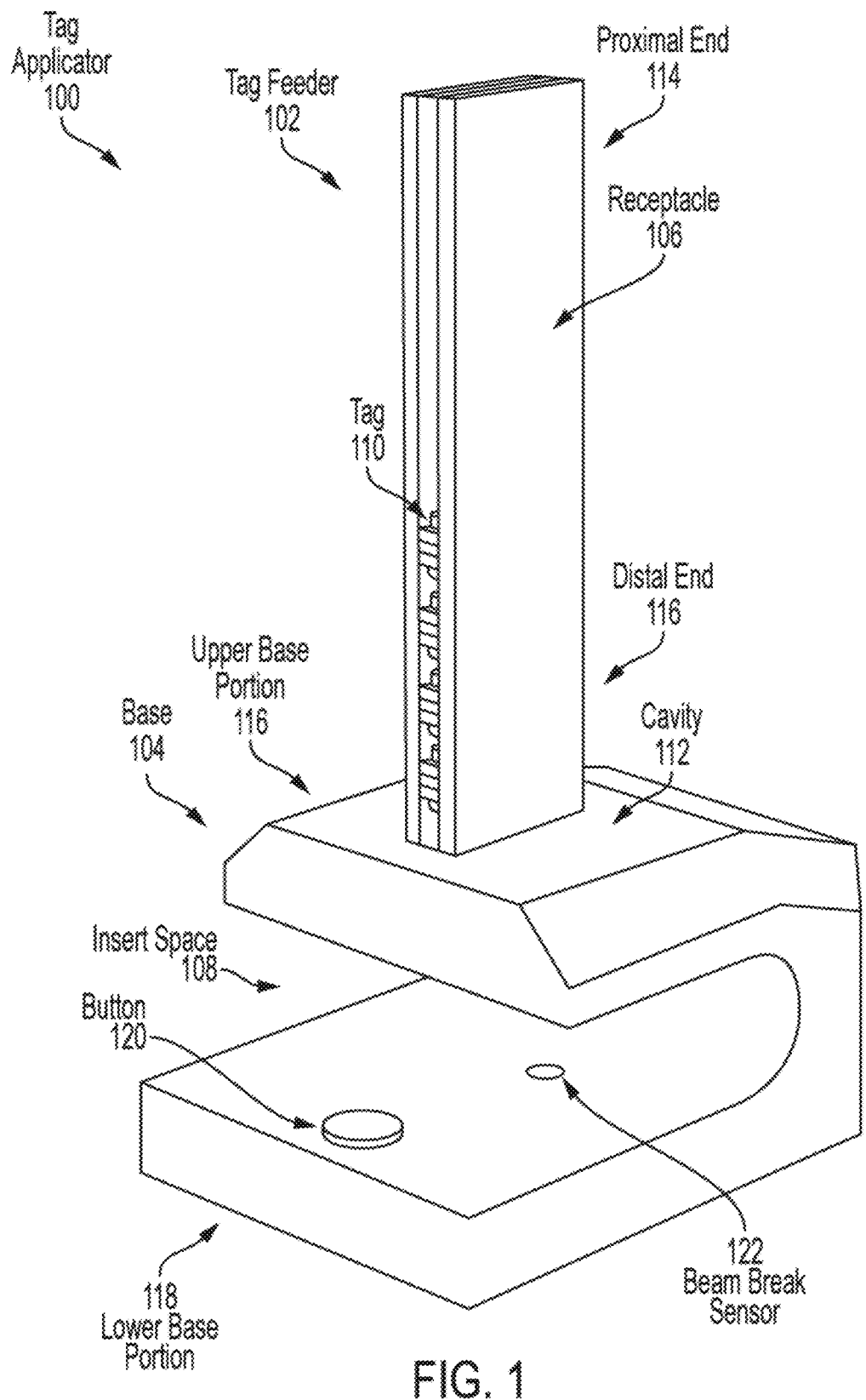
FIG. 1 is an illustration of an illustrative tag applicator.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns the application of tags to items for purposes of protecting the same from unauthorized use and/or controlling product inventory. The tags can include, but are not limited to, EAS security tags, RFID tags and/or hybrid EAS/RFID tags. Each of the listed types of tags are well known in the art, and therefore will not be described herein. Any known or to be known EAS security tag, RFID tag and/or hybrid EAS/RFID tag can be used herein without limitation.

Conventionally, EAS security tags have been applied to items using a three step manual process (i.e., (1) manually holding an EAS security tag body in one hand while holding a retaining pin in the other hand, (2) inserting the retaining pin through the item, and (3) inserting the retaining pin into the EAS security tag body located on the other side of the item). In contrast, the present solution provides a tag applicator device that applies tags to items using a one-step semi-automated or automated process. The one-step semi-automated or automated process reduces in-store tagging labor operation costs, tag shipping, inventory simplicity, and safety concerns with manual handling of tags and retaining pins. The tag applicator can be stationary or mobile (e.g., a handheld tag reader with tag applicator functionality incorporated therein). In the stationary scenarios, the tag applicator can be mounted on a support structure (e.g., a table via clamps, screws, bolts, tracks, etc. . . . ). In the mobile scenarios, the tag applicator can include a rechargeable battery and wireless communication capability for communicating wirelessly with an enterprise system (e.g., a remote server) via a network (e.g., the Internet or Intranet).

In the one-step semi-automated scenarios, the tag applicator has an insert space where a user places at least a portion of an item. Once the item is positioned in the insert space the tag is securely coupled thereto. For example, a retaining pin is automatically inserted through the item and into a tag body.

In the one-step automated scenarios, the present solution provides a fully automated system in which items are placed on a receiver that is auto indexed and travels through an automated tag application point at which the tag is coupled thereto.

In both scenarios, the tag applicator consists of four main components: a tag feeder (e.g., a magazine or cartridge into which tags are loaded, a vibratory feeder, and/or an index rotary table); a nest where a tag will be positioned ready for application to an item; an electromechanical or mechanical tag placer for moving the tag into position within the nest; and a securement mechanism driver (e.g., a linear actuator (e.g., a plunger), a solenoid and/or a motor) to couple the tag to the item. For example, the securement mechanism driver drives (A) one tag component towards another tag component (e.g., drives a retaining pin through the item to be tagged and into the tag body located under the item, drives a first snap-n-fit component towards a second snap-n-fit component, or drives a first clamping component towards a second clamping component), or (B) rotates a rotatable component (e.g., a cable tie, a rigid arm, etc.) around the item until the rotatable component is securely coupled (e.g., fastened or latched) to the tag body.

The novel features of the tag applicator include, but are not limited to: automating the application of a tag such that the tag and/or retaining pin are never handled by a user; and tracking and managing tags via a tag feeder (e.g., cartridge) loading system designed to reduce tag waste as well as count and manage store inventory via the automated tagging and reading process (e.g., RFID enabled tags). The tag feeder (e.g., cartridge) loading system is a common component that can be applied to the automated source tagging system or a "mini auto tagger" designed for use in a retail environment and may hold a preset amount, thus ensuring accurate counts. Furthermore the tag feeder (e.g., cartridge) loading systems, as a common pack, can be used for shipping accurate and prepacked quantities of tags.

Referring now to FIG. 1, there is provided a front perspective view of an illustrative tag applicator 100. The tag applicator 100 is designed to be used with tags 110. Tags are well known in the art, and therefore will not be described herein. Any known or to be known security tag, inventorying tag and/or marker can be used herein without limitation. For example, the tags 110 comprise modular security tags with retractable pins (e.g., the tag disclosed in U.S. Pat. No. 9,734,683 to Perez). The present solution is not limited to the particulars of this example. The tags 102 can additionally or alternatively comprise: two piece security tags where the tag's housing base and pin are separate components (e.g., the security tag disclosed in U.S. Pat. No. 9,390,602 to Patterson et al.); security tags with rotational clips that are latched to the security tag's housing base (e.g., the security tags disclosed in U.S. Pat. No. 9,803,401 to Luo and/or U.S. Pat. No. 9,637,951 to Lou); snap-n-fit tags; clamping tags; and/or cable tie tags.

The tag applicator 100 comprises a tag feeder 102 for receiving and dispensing tags 110. The tag feeder 102 is shown in FIG. 1 as comprising a linear cartridge. The present solution is not limited in this regard. The tag feeder 102 can alternatively comprise a rotary cartridge (e.g., as shown in FIGS. 9-17), a magazine, a vibratory feeder (e.g., a carousel and/or a funnel), and/or an index rotary table.

Figure 2:
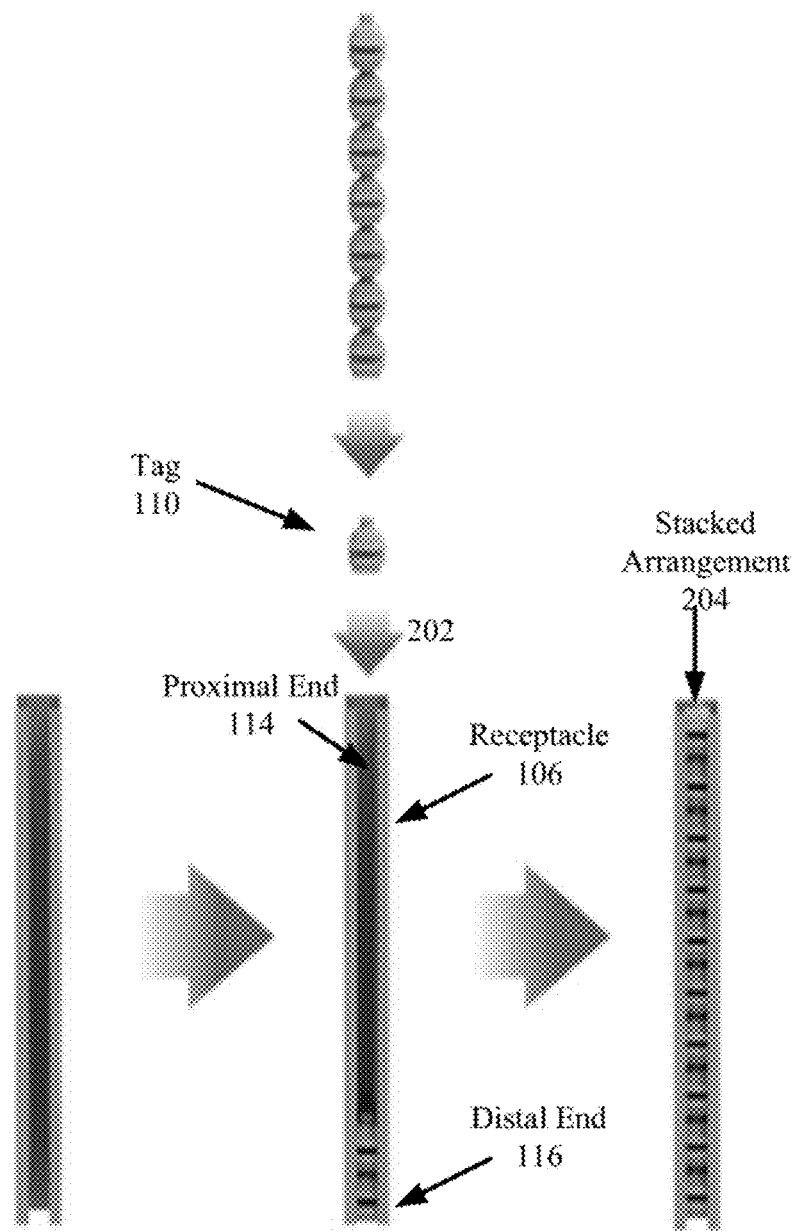
FIG. 2 is an illustration that is useful for understanding how tags are loaded into a cartridge of the tag applicator shown in FIG. 1.
Figure 5:
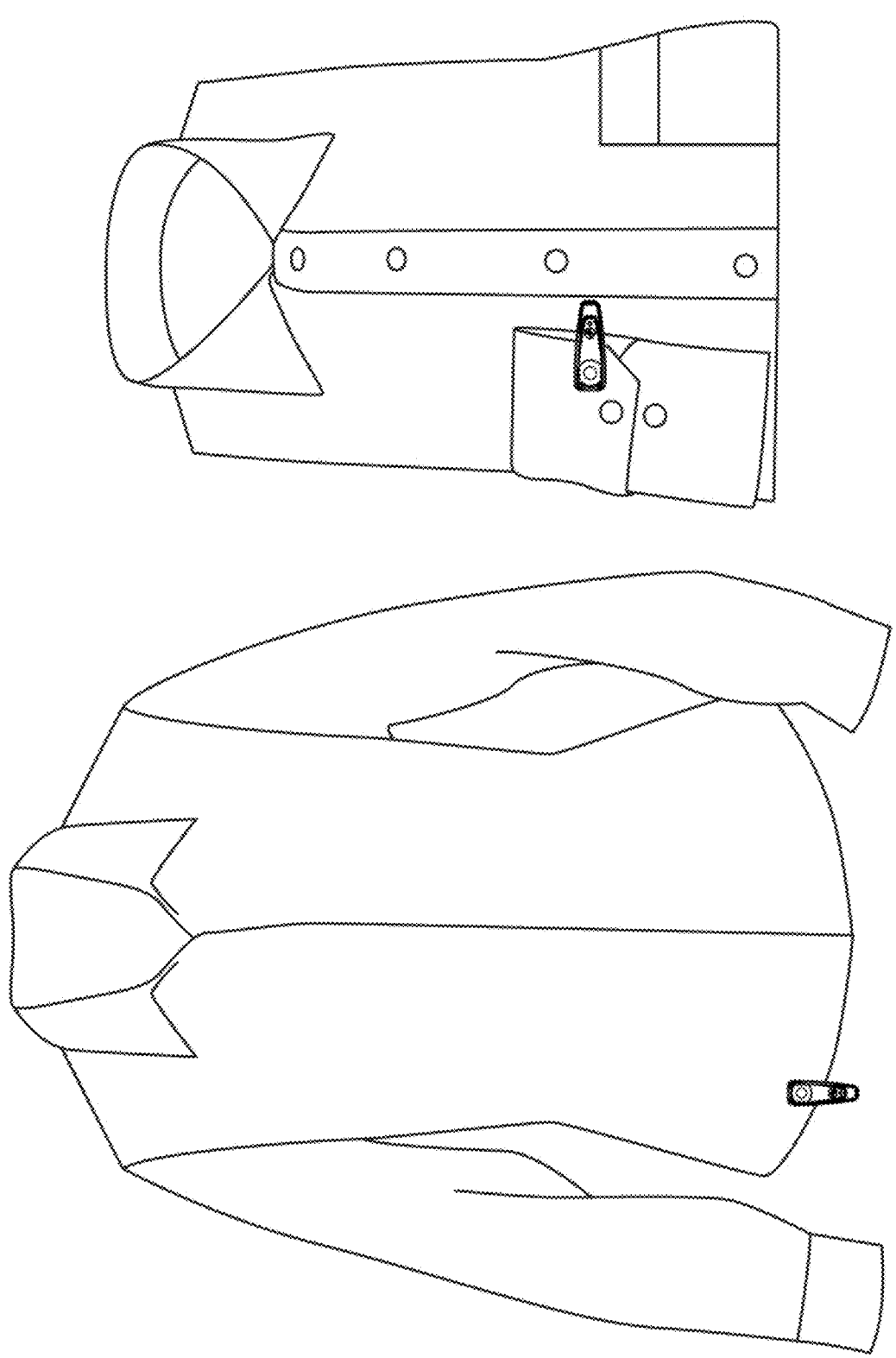
FIG. 5 provides illustrations of items with tag's attached thereto.

In the linear cartridge scenarios, the tag feeder 102 comprises a hollow receptacle 106 with a proximal end 114 and a distal end 116. During a cartridge filling process shown in FIG. 2, the tags 110 are inserted into the proximal end 114 of the hollow receptacle 106. In some scenarios, gravity causes the inserted tags to drop in a downward direction 202 towards the distal end 116 of the hollow receptacle 106. In other scenarios, the already inserted tags are forced to move in a direction towards the distal end 116 of the hollow receptacle 106 as more tags are inserted into the hollow receptacle 106. The tags 110 are stored in the receptacle 106 in a stacked arrangement 204.

Once filled, the cartridge 102 is inserted into a cavity 112 formed in the tag applicator's base 104, as shown in FIG. 1. The cavity 112 is sized and shaped to receive at least a portion of the cartridge's distal end 116. The cartridge 102 is structurally supported by the base 104 in a vertical arrangement such that gravity can be optionally used to facilitate the dispensing of the tags 110 during subsequent tag application processes. The dispensing can be achieved using mechanical, air, magnetic/electromagnetic and/or hydraulic actuation for tag movement.

Figure 8:
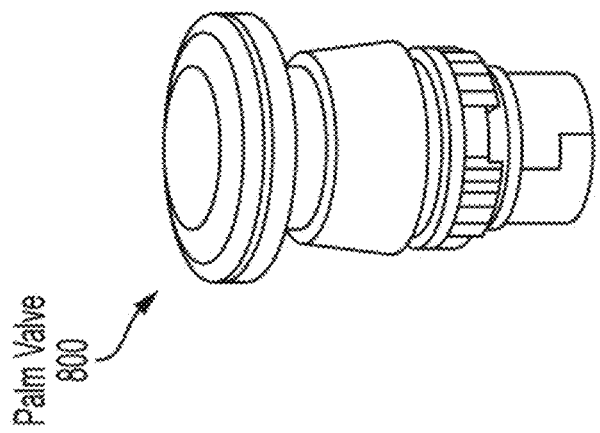
FIG. 8 is an image of an illustrative palm valve.
Figure 7:
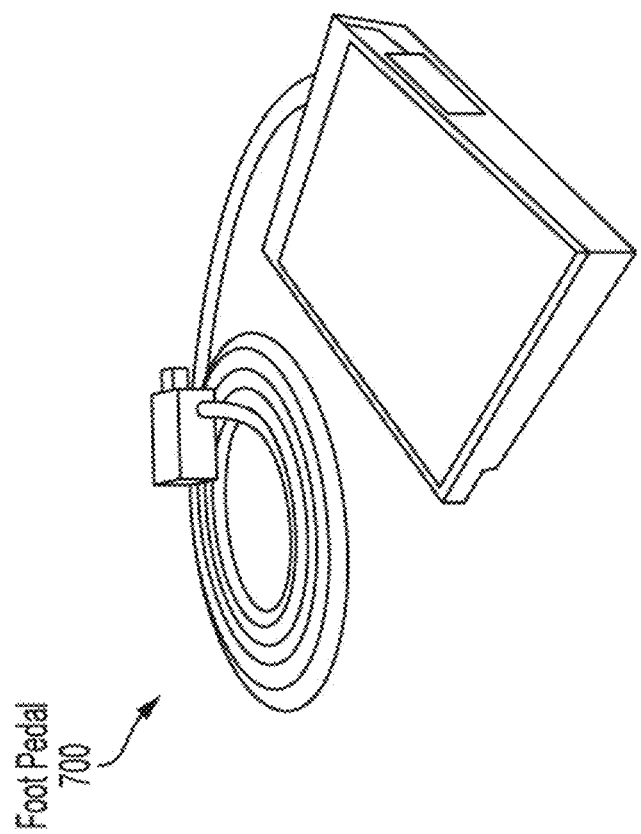
FIG. 7 is an image of an illustrative foot pedestal.

The base 104 has an insert space 108 for receiving an item to which a tag 110 should be coupled. During operation, an individual places an item to be protected either onto an item receiver of an assembly line (not shown) or directly into the insert space 108 of the base 104. An illustration showing an individual 302 placing an item 304 into the insert space is provided in FIG. 3. At this time, the tag applicator 100 waits for a user-software interaction indicating that the item is properly inserted into the insert space 108. The user-software interaction can be achieved using (a) a foot pedal communicatively coupled to the base 104 (e.g., foot pedal 700 of FIG. 7), (b) palm valves (e.g., palm valve 800 of FIG. 8), (c) a voice command, (d) a pair of anti-tie down buttons that are energized by the user when the item is properly placed in the insert space, and/or (e) an indirect depression of one or more buttons 120 via the item insertion into the insert space 108 (e.g., where the push button(s) reside in the insert space). Alternatively, the tag applicator 100 performs operations to detect when the item is properly inserted into the insert space 108. This detection can be made using a beam break sensor 122, a proximity sensor, acoustic sensor (e.g., ultrasonic), or computer vision system.

Once the tag applicator 100 has knowledge of the item's proper placement in the insert space 108, it performs actions to initiate tag application operations. In some modular tag applications (i.e., where a retractable pin is secured to the security tag body), a lowest security tag is automatically moved into a nest (not shown in FIG. 1) below the cavity 112. This movement of the tag body can occur prior to or subsequent to the item's insertion into insert space 108. A securement mechanism driver (e.g., a linear actuator not shown in FIG. 1) is positioned directly above the nest. When energized, the securement mechanism driver drives a retaining means of a first housing portion towards a second opposing housing portion (e.g., drives a retractable pin (not shown in FIG. 1) out of a first housing portion of the tag, through the item to be tagged, and into a second opposing housing portion of the tag). The present solution is not limited to the particulars of this example.

As mentioned above, the present solution can also be used with two piece tags (i.e., where the tag's base and retaining pin are separate components). In these scenarios, the tag applicator 100 has two cavities, namely a first cavity to receive a first feeder (e.g., a cartridge) holding the tag bases and a second cavity to receive a second feeder (e.g., cartridge) holding the separate retaining pins. The first and second cavities can be located at any location on the base 104 in accordance with a particular application. For example, the first cavity is located on the lower base portion 118 such that the tag base can be moved (in a horizontal direction) into the nest (which will reside under an item to be tagged), and the second cavity is located on the upper base portion 116 such that the pin can be driven in a downward vertical direction through the item and into the security tag base. The present solution is not limited to the particulars of this example. Alternatively, the first cavity is located on the upper base portion 116, while the second cavity is located on the lower base portion 118 such that the pin is driven in an upwards vertical direction rather than a downwards direction. In other scenarios, the first and second cavities alternatively reside on the same base portion 116 or 118.

As also mentioned above, the present solution can be used with one piece tags comprising a rotatable member. In these scenarios, the tag applicator 100 has one cavity sized and shaped to receive a tag feeder (e.g., a cartridge) filled with one piece tags. Each tag is moved from the tag feeder in proximity to a respective item to be tagged. Once in proximity, the rotatable member is rotated around at least a portion of the item, and latched or fastened into an engaged position via a latching or fastening mechanism of the tag. The present solution is not limited to the particulars of these scenarios.

The present solution also enables the ability to control and improve tracking of the tags 110 via the preloaded tag feeders (e.g., cartridges) 102 and automated counts. The simple and accurate control of tags 110 are enhanced by having pre-loaded/pre-counted tag feeder packs of specific amounts ready for use at the source tagging point or as ready to ship pre-packs for distribution to retailer locations. The pre-loaded tag feeders could be further automated to sort and load recycled tags from the same customer. This has applicability to self-checkout kiosks where tags are collected into sealed containers. These collected tag are subsequently recycled and reloaded into the tag feeders (e.g., cartridges). An illustrative kiosk which can be used with the present solution is described in U.S. Pat. No. 9,734,683.

In some scenarios, the tags are collected in a tag canister comprising a plurality of chutes or columns. In order to load the tags into a tag feeder, the tag canister is rotated manually (e.g., via a one-clutch bearing) or automatively (e.g., via a linear actuator) to different indexed locations wherein tags are loaded into a tag feeder from the chutes/columns. When a chute/column becomes empty and the tag feeder is not fully loaded with tags, the tag canister is rotated to a next indexed location so that tags in another chute or column are loaded into the tag feeder. This process is repeated until the tag feeder is fully loaded and/or until no more tags are contained in the tag canister. Sensors can be provided to detected these two scenarios. User feedback can be provided (e.g., via an LED and/or display) on the tag applicator, tag feeder and/or tag canister for indicating a total number of tag loaded into each tag feeder during the tag loading process and/or the total number of tag remaining in the tag canister.

Figure 6:
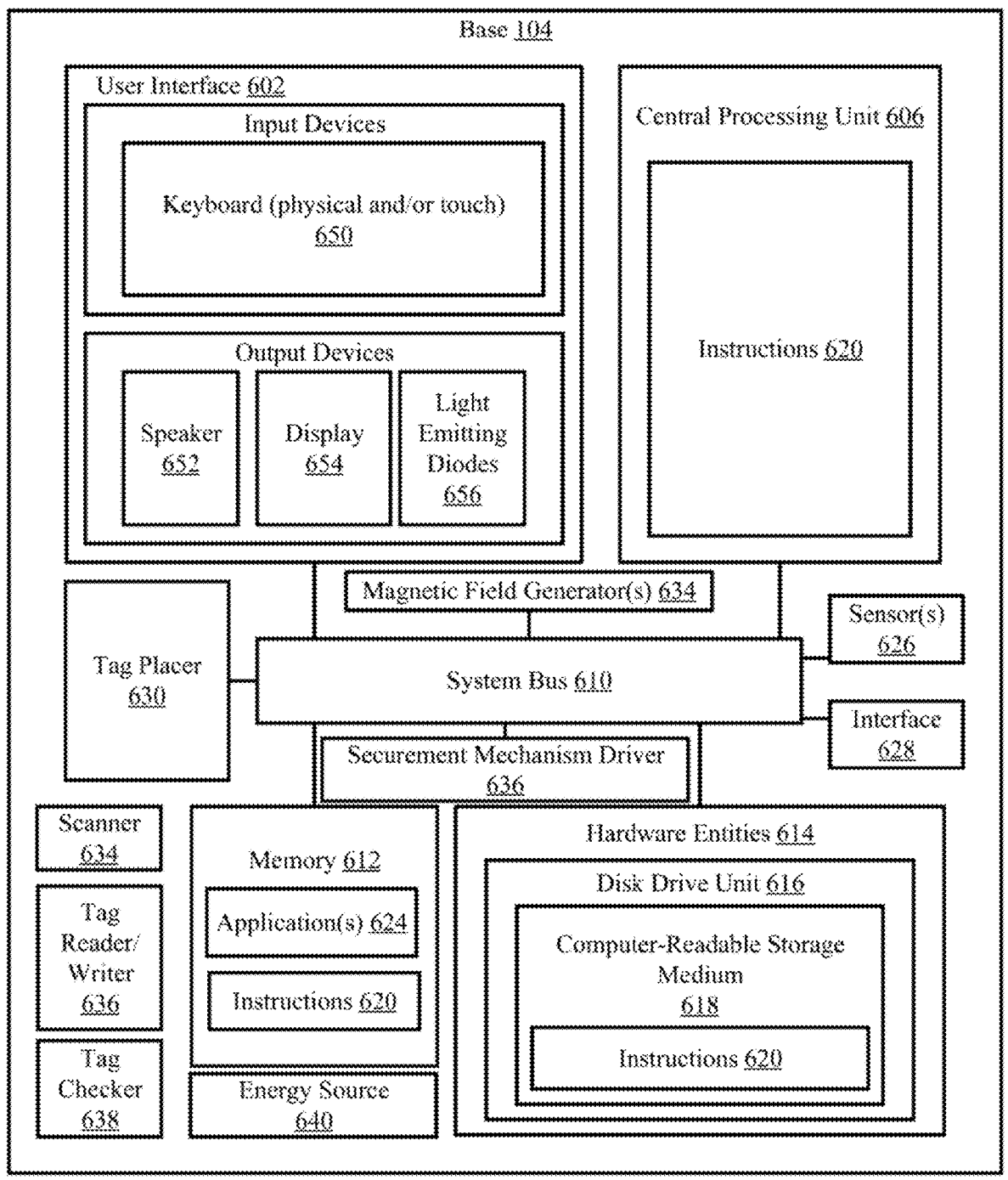
FIG. 6 is an illustration of an illustrative architecture for a base of the tag applicator shown in FIG. 1.

Referring now to FIG. 6, there is provided a detailed block diagram of an illustrative architecture for the tag's base 104. The base 104 may include more or less components than those shown in FIG. 6. However, the components shown are sufficient to disclose an illustrative embodiment implementing the present solution. The hardware architecture of FIG. 6 represents one embodiment of a representative base 104 configured to facilitate the automation of a tag's application to an item. As such, the base 104 implements at least a portion of a method for applying a tag to an item as discussed herein. Some or all the components of the base 104 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 6, the base 104 comprises a user interface 602, a Central Processing Unit ("CPU") 606, a system bus 610, a memory 612 connected to and accessible by other portions of base 104 through system bus 610, and hardware entities 614 connected to system bus 610. The user interface can include input devices (e.g., a keypad 650) and output devices (e.g., speaker 652, a display 654, and/or light emitting diodes 656), which facilitate user-software interactions for controlling operations of the base 104.

At least some of the hardware entities 614 perform actions involving access to and use of memory 612, which can be a Random Access Memory ("RAM"), a disk driver and/or a Compact Disc Read Only Memory ("CD-ROM"). Hardware entities 614 can include a disk drive unit 616 comprising a computer-readable storage medium 618 on which is stored one or more sets of instructions 620 (e.g., software code) configured to implement one or more of the methodologies, procedures, or functions described herein. The instructions 620 can also reside, completely or at least partially, within the memory 612 and/or within the CPU 606 during execution thereof by the base 104. The memory 612 and the CPU 606 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution by the base 104 and that cause the base 104 to perform any one or more of the methodologies of the present disclosure.

In some scenarios, the hardware entities 614 include an electronic circuit (e.g., a processor) programmed for facilitating the tag application functions. In this regard, it should be understood that the electronic circuit can access and run a software application 624 installed on the base 104. The software application 624 is generally operative to facilitate the performance of tag application related operations. Other functions of the software application 624 are apparent from the remaining discussion of this document.

The base 104 also comprises an interface 628 (which may be an optional component). The interface 628 facilitates communications with remote devices, such as a foot pedestal 700 shown in FIG. 7 (e.g., via a wired or wireless communications link), a palm valve 800 shown in FIG. 8, or an enterprise system via a network. The network can include, but is not limited to, the Internet, an Intranet, and/or a cellular network. The foot pedestal and/or palm valves provide(s) a way for an operator of the base 104 to notify the CPU 606 that an item is properly placed in the insert space. The foot pedestal and palm valves can constitute sensors provided with the tag applicator. In response to this notification, the CPU 606 initializes operations of the base 104 to attach a tag to the item.

The base 104 further comprises at least one sensor 626 (which may be an optional component). The sensor includes, but is not limited to, a beam break sensor (e.g., beam break sensor 122 of FIG. 1) and/or a button (e.g., button 120 of FIG. 1). The sensor is configured to detect when an item is properly placed in an insert space of the base 104. Upon such a detection, the sensor notifies the CPU 606, e.g., provides feedback information to the CPU. In response to this notification and/or feedback information, the CPU 606 initializes operations of the base 104 to attach a tag to the item.

At least one tag placer 630 is also provided in the base 104. The tag placer 630 includes, but is not limited to, a linear actuator, a robotic arm (e.g., an articulating arm with a gripper), a clamp, a solenoid, a motor, gears, a telescopic mechanism, a conveyer belt, a track, a rotatable structure, and/or other mechanical mechanism configured to convert energy (e.g., electricity) to create motion in one or more directions. The tag placer 630 is generally configured to: engage a tag dispensed from the tag feeder (e.g., cartridge) and move the same into position within a nest such that a tag can be automatically attached to an item. For example, the tag can be (1) moved vertically downward or upward from the tag feeder (e.g., cartridge) 102 such that the tag's insert space (i.e., for receiving at least a portion of the item) is aligned with the item, and/or (2) moved horizontally towards the tag's insert space. The present solution is not limited to the particulars of this example. In other scenarios, the tag's body is moved so that it resides below, above or on the side of the insert space where a portion of the item is or is to be placed for tagging purposes.

A securement mechanism driver 636 is also provided to cause the tag to be coupled to an item. In this regard, the securement mechanism driver 636 is configured (a) to cause a pin to be inserted through the item and into the tag's body, (b) to cause a first mating tag portion to be moved towards a second mating tag portion, or (c) to cause an engagement member of the tag to rotate until the engagement member contacts a latch or fastener disposed in the tag's body. In some scenarios, the securement mechanism driver 636 is configured to: drive a separate pin through the item and into the tag's body located above, below or to the side of the item; and/or actuate a retractable pin of the tag via rotation of a knob, depression of a button, and/or the application of a magnetic field to the tag. The knob can be rotated or the button can be depressed by the robotic arm or other mechanical component of the base 104. The magnetic field can be applied by a magnetic field generator 634 provided with the base 104.

The base 104 may further comprise a scanner 634, a tag reader/writer 636, a tag checker 638, and/or an energy source 640. The scanner 634 can include, but is not limited to, a barcode reader. A tag can be programmed with barcode information acquired by the scanner 634 via the tag reader/writer 636. Operations of the tag can be checked by the tag checker 638. Additionally or alternatively, the tag's internal power source (e.g., a capacitor or battery) can be charged via the harvesting of energy provided by the energy source 640.

Referring now to FIGS. 9-17, there are provided illustrations that are useful for understanding another illustrative tag applicator 900. Tag applicator 900 comprises a tag feeder 902 and a base 904. The tag feeder 902 comprises a rotary cartridge. A plurality of tags 906 are housed in the tag feeder 902. Tags are well known in the art, and will not be described here. In some scenarios, the tags 906 include, but are not limited to, InFuzion magnetic tags available from Tyco Sensormatic of Boca Raton, Florida.

Figure 14:
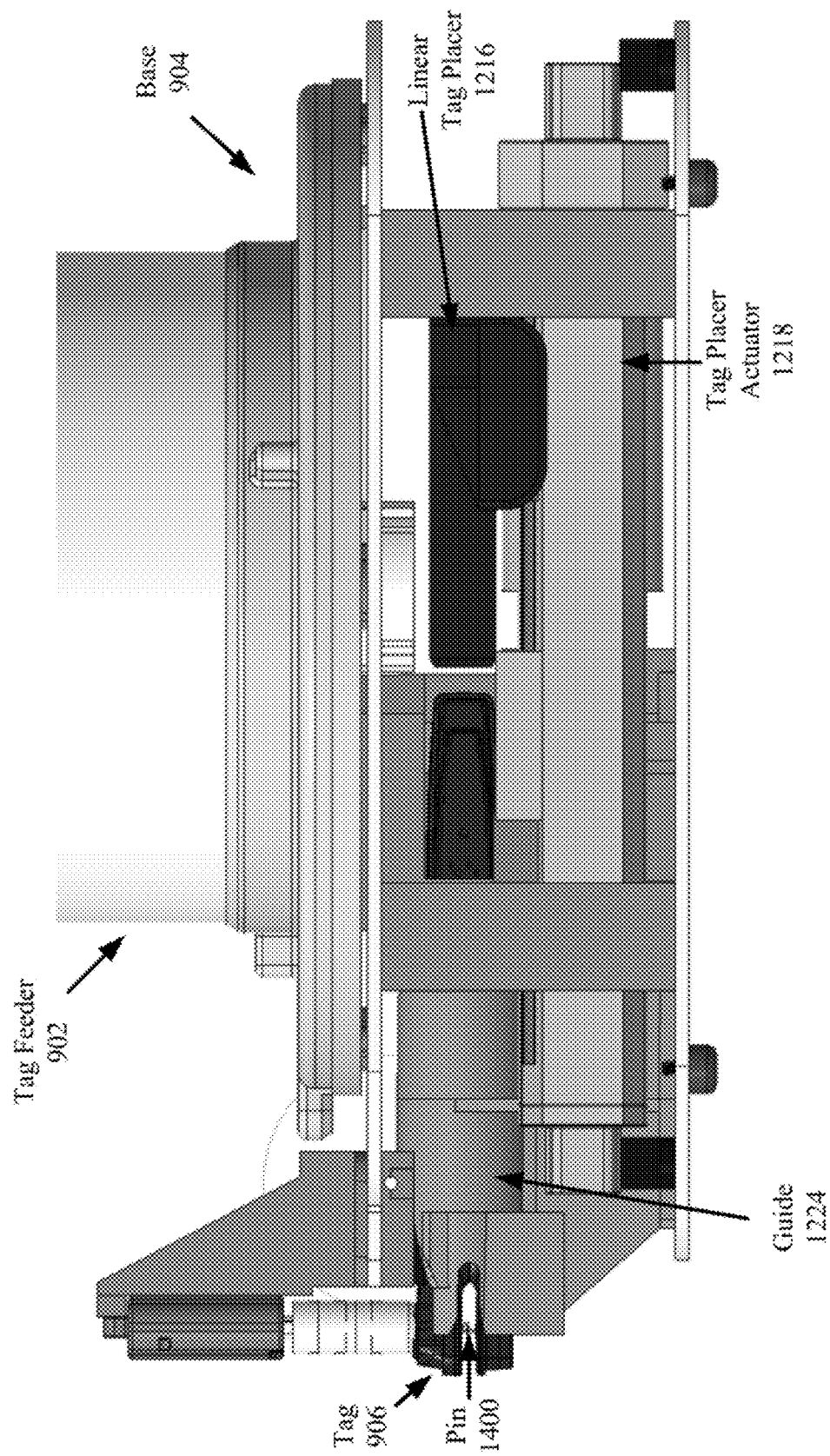
FIG. 14 is an illustration that is useful for understanding how a tag is moved from a tag feeder to a nest.

Illustrations of tag 906 are provided in FIGS. 18-20. As shown in FIGS. 18-20, tag 906 comprises a housing 1800 with an insert space 1900 formed therein. The insert space 1900 is sized and shaped to receive at least a portion of an item 2000 (e.g., a piece of clothing). An actuator 1902 is provided with a pin (e.g., pin 1400 of FIG. 14) coupled thereto. In an unengaged state, the actuator 1902 extends out and away from the housing 1800 as shown in FIG. 19, and the pin resides inside a first portion 1904 of the housing 1800. When the actuator 1902 is depressed as shown in FIG. 20, the pin is driven out of the first housing portion 1904, through the insert space 1900, and into a second portion 1906 of the housing 1800 (e.g., as shown in FIG. 14). If an item resides in insert space 1900 as shown in FIG. 20, then the pin is driven through the item. An end of the pin is then engaged by a securement member (e.g., a clamp) located in the second housing portion 1906. In this way, the tag 906 is securely coupled to the item 2000. The pin is released from the securement member (e.g., a clamp) via the application of a magnetic field to the tag 906.

Tag 906 is shown in FIG. 20 as being manually coupled to an item 2000. The tag applicator 900 of the present solution provides an automated way to couple the tag 906 to an item, such as item 1502 of FIG. 15 or item 2000 of FIG. 20.

Figure 9:
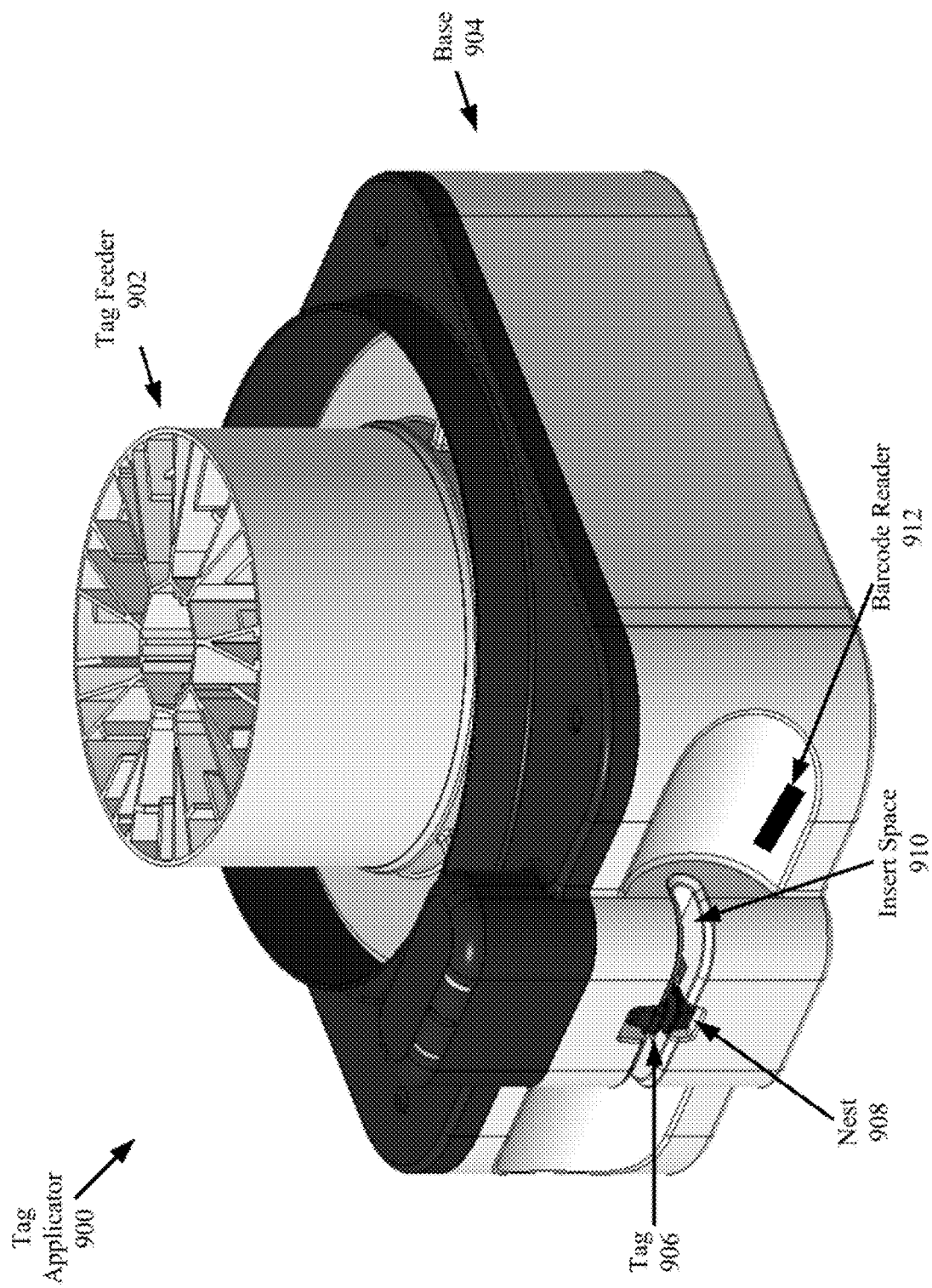
FIG. 9 is front perspective view of another illustrative tag applicator.
Figure 10:
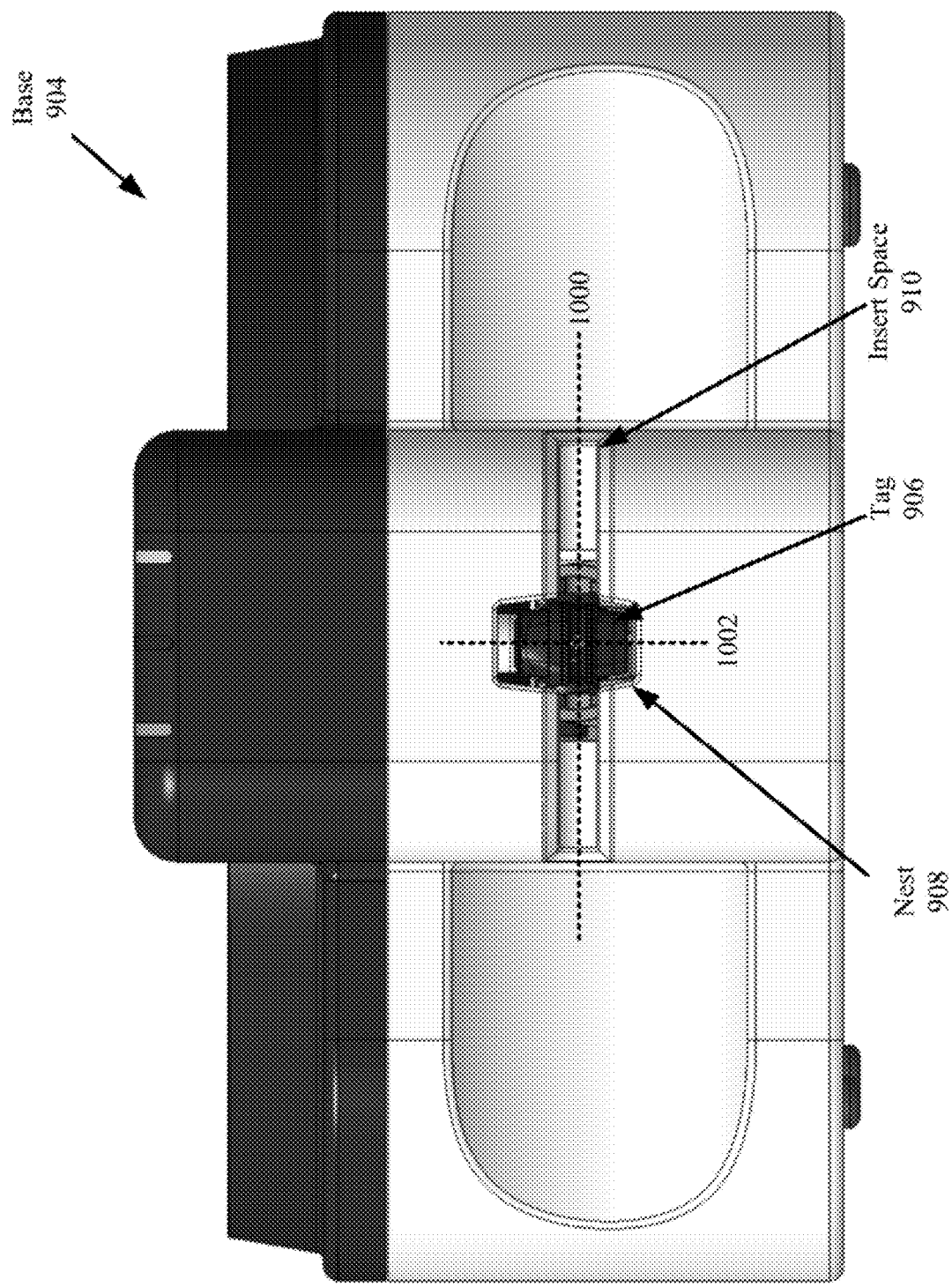
FIG. 10 is a front view of the tag applicator shown in FIG. 9 with a tag feeder removed therefrom.
Figure 11:
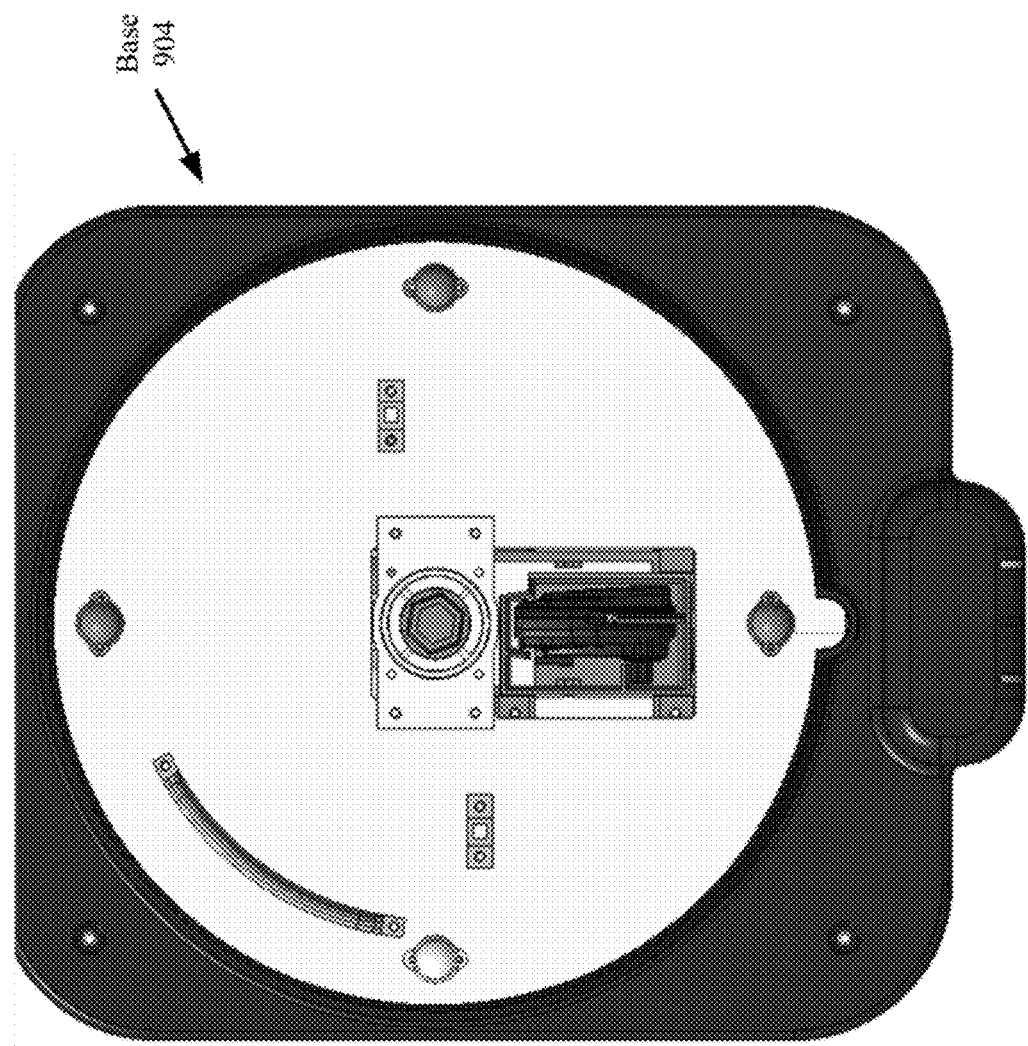
FIG. 11 is a top view of the tag applicator shown in FIG. 9 with a tag feeder removed therefrom.

With reference to FIGS. 9-17, the tag applicator 900 comprises internal components that are configured to move the tag 906 from the tag feeder 902 into a nest 908 such that the tag's insert space 1900 is vertically and horizontally aligned with the tag applicator's insert space 910 as shown in FIGS. 9-10, i.e., the insert spaces 910 and 1900 have the same center horizontal axis 1000 and the same center vertical axis 1002 as shown in FIG. 10. The movement of the tag 906 into the nest 908 can occur prior to or subsequent to when the item is placed in the insert space 910 of the tag applicator.

Subsequent to when an item 1802 is placed in the insert space 910 (e.g., as shown in FIG. 18) of the tag applicator 900, tag application operations of the tag applicator 900 are initiated when certain criteria is met. For example, the tag application operations are initiated when (a) the detection is made that the tag 906 is properly placed in the nest 908, (b) an item is properly located in the insert space 910, and/or (c) a user-software interaction is received by the tag applicator 900. The user-software interaction may be achieved via a foot pedal (e.g., foot pedal 700 of FIG. 7) and/or a palm valve (e.g., palm valve 800 of FIG. 8). The user-software interaction can be performed to provide notification to the tag applicator that the item is properly located in the insert space 910, and/or that the user is requesting performance of the tag application operations to couple the tag 900 to the item.

The tag application operations involve supplying power to a plunger actuator 1220 (e.g., motor, gear(s), and/or piston). The plunger actuator 1220 actuates a plunger 1200 that is positioned directly above the nest 908. The plunger 1200 moves in one-dimension along a straight line 1250. In some scenarios, the plunger actuator 1220 and plunger 1200 collectively comprise a Commercial Off The Shelf ("COTS") part. For example, the COTS part includes an electric linear actuator having part number PQ12-P which is available from Actuonix Motion Devices Inc. of Victoria, Canada. The present solution is not limited in this regard. A pneumatic actuations can be used in addition to or as an alternative to an electric linear actuator.

Figure 12:
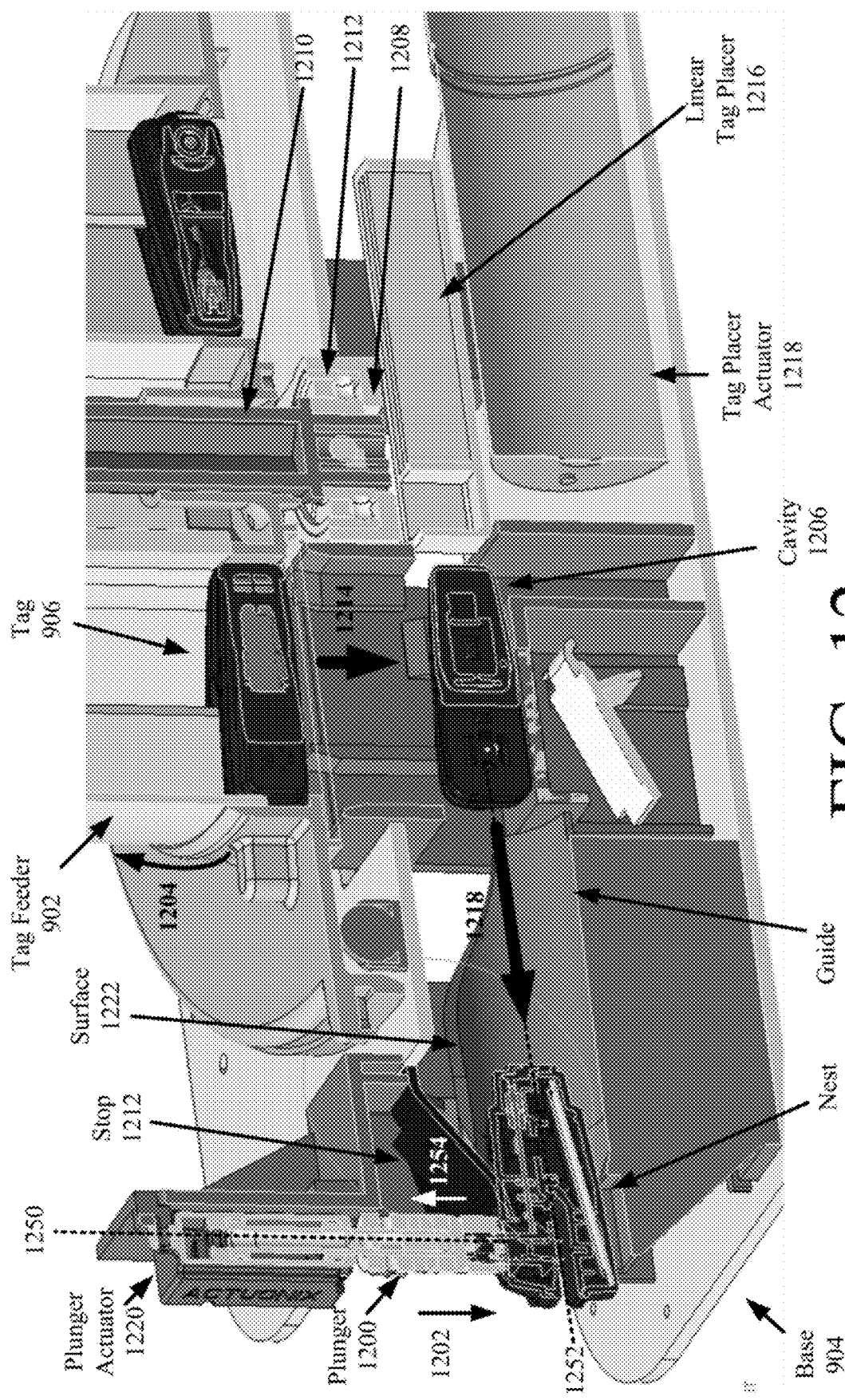
FIG. 12 is a cross-sectional view of the tag applicator shown in FIG. 9 that is useful for understanding how a tag is moved from a tag feeder to a nest.
Figure 16:
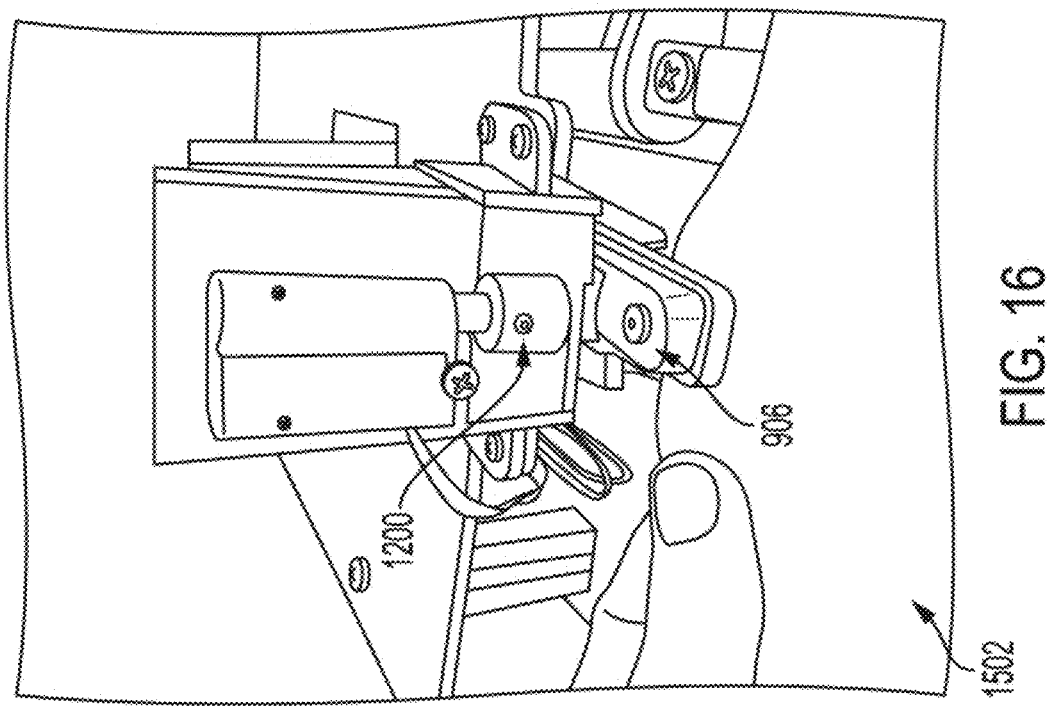
FIGS. 15-16 provide illustrations showing use of the tag applicator of FIGS. 9-14.
Figure 15:
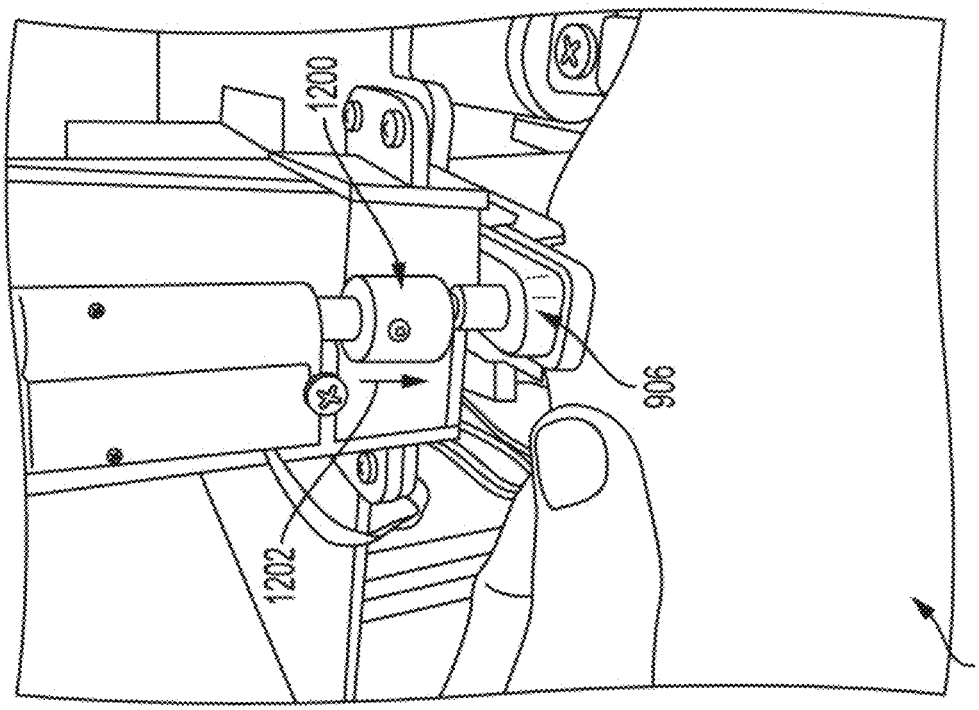

When actuated, the plunger 1200 applies a pushing force on the tag's actuator 1902 in a direction towards the tag housing 1800, as shown by arrow 1202 of FIGS. 12 and 15. In effect, the tag's actuator 1902 is depressed whereby the pin is driven out of the first housing portion 1904, through the insert space 1900, and into the second housing portion 1906. An end of the pin is then engaged by a securement member (e.g., a clamp that engages a notch formed on the pin's elongate body) located in the second housing portion 1906 (as shown in FIG. 14). In this way, the tag 906 is securely coupled to the item 1502, as shown in FIG. 16.

Figure 13:
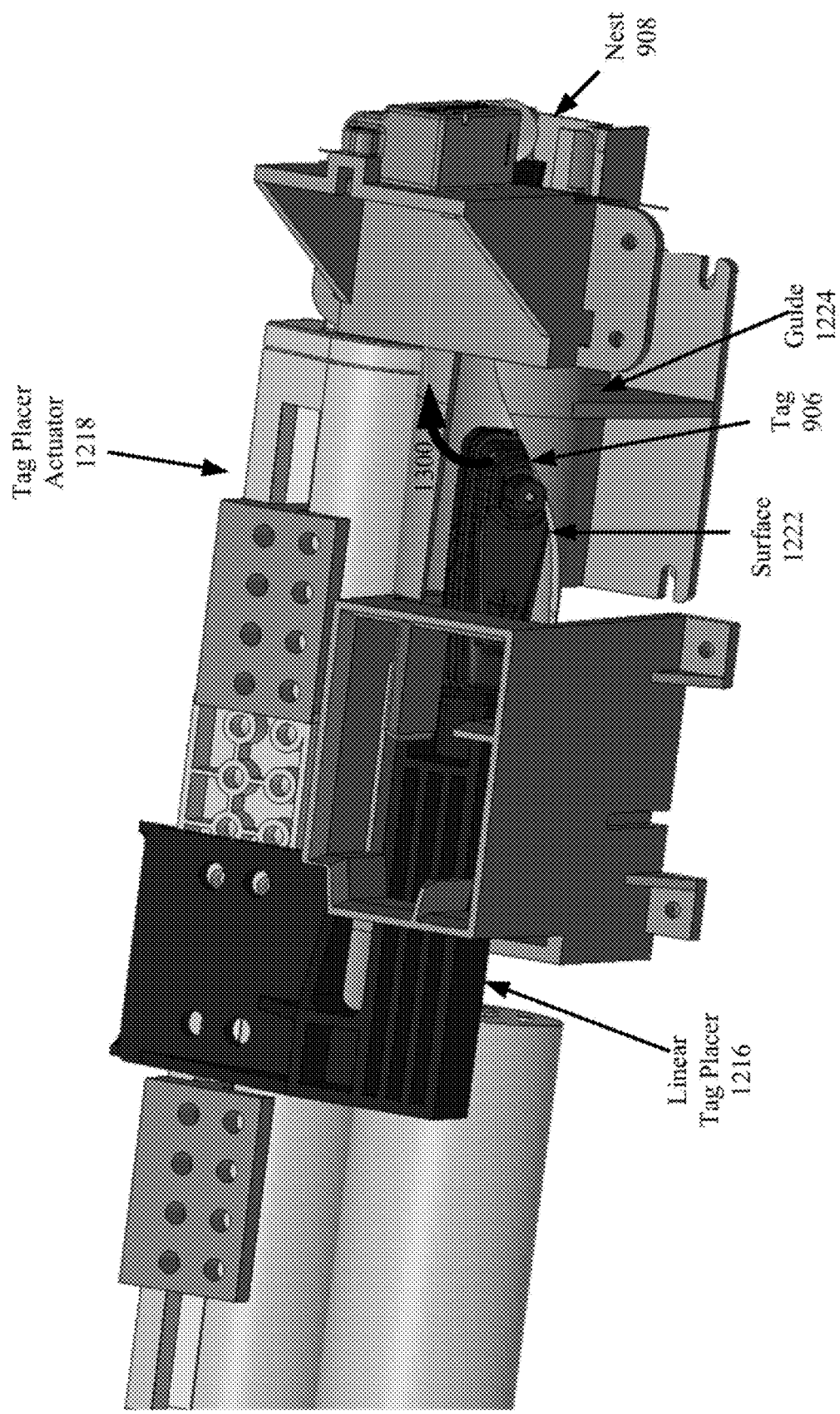
FIG. 13 is an illustration that is useful for understanding how a tag is moved from a tag feeder to a nest.

A discussion is now provided in relation to FIGS. 12-14 to explain in detail how the tag 906 is moved from the tag feeder 902 into the nest 908. First, the tag feeder 902 is rotated in a clockwise direction as shown by arrow 1204 in FIG. 12 until a tag is aligned with the cavity 1206. In other scenarios, the tag feeder 902 is rotated in a counter clockwise direction. A rotation mechanism 1208 is provided to facilitate this rotation of the tag feeder 902. The rotation mechanism 1208 comprises a motor (not shown), gear(s) 1212 and/or an engagement structure 1210 for rotatably engaging the tag feeder 902. The present solution is not limited in this regard. Other techniques for causing rotation of a structure can be used herein.

Once the tag 906 is aligned with the cavity 1206, it drops down into the same as a result of a gravitational force being applied thereto as shown by arrow 1214 of FIG. 12. In this regard, there is no structure preventing the tag from dropping down into the cavity once aligned therewith. The present solution is not limited in this regard. In other scenarios, a movable plate or hinged door is provided to selectively control when the tag actually drops into the cavity.

Next, a tag placer actuator 1218 (e.g., a motor, gear(s) and/or piston) is supplied power. The tag placer actuator 1218 then causes a linear tag placer 1216 to move linearly in a direction 1218, i.e., to move in one-dimension along a straight line 1252. Straight line 1252 is perpendicular to straight line 1250. In some scenarios, the tag placer actuator 1218 and linear tag placer 1216 collectively comprise a Commercial Off The Shelf ("COTS") part. For example, the COTS part includes an electric track linear actuator having a part number FA-35-TR-12-XX which is available from Firgelli Automations of Ferndale, Washington. The present solution is not limited in this regard. A pneumatic actuations can be used in addition to or as an alternative to an electric linear actuator.

As the linear tag placer 1216 moves in direction 1218, it applies a pushing force to the tag 906. Consequently, the tag 906 is pushed into the nest 908 through a guide 1224. As the tag 906 is being pushed by the linear tag placer 1216 towards the nest 908, the actuator 1902 of the tag 906 slidingly engages a surface 1222 of the guide 1224. In effect, the tag 906 rotates in a direction shown by arrow 1300 of FIG. 13. Accordingly, surface 1222 is curved so that the orientation of the tag 906 is changed by a given angle (e.g., ninety degrees) as the tag's actuator 1902 slides there against towards the nest 908. The angle is chosen so that the tag 906 is in the proper orientation when fully located in the nest 908 (e.g., a center axis of the tag's actuator 1902 is parallel and is substantially aligned (e.g., <1 cm offset) with the center axis of the plunger 1200). The present solution is not limited in this regard. In other scenarios, the tag is not rotated as discussed here since it enters the cavity 1206 from the tag feeder 902 with the proper orientation.

When the tag 906 is fully inserted into the nest 908, a stop 1212 engages a surface thereof so as to prevent reverse movement of the tag in a direction opposite to the direction shown by arrow 1218 of FIG. 12. In some scenarios, the stop 1212 includes a rigid structure that is configured to bend or rotate about a pivot point. In other scenarios, the stop 1212 includes a rigid structure that is resiliently biased in a direction 1202 towards the guide 1224. The resilient bias can be provided by a spring that may or may not be integrated with the stop's rigid structure. As the tag 906 travels through the guide and into the nest, it applies an upward pushing force to the stop 1212 which causes the stop 1212 to slide against the tag until the tag is in its final resting position within the nest 908. At this point, the stop 1212 can no longer be pushed upwards 1254 by the tag 906, and therefore the tag 906 is prevented by stop 1212 from moving in a reverse direction towards the cavity 1206 and tag feeder 902.

Figure 17:
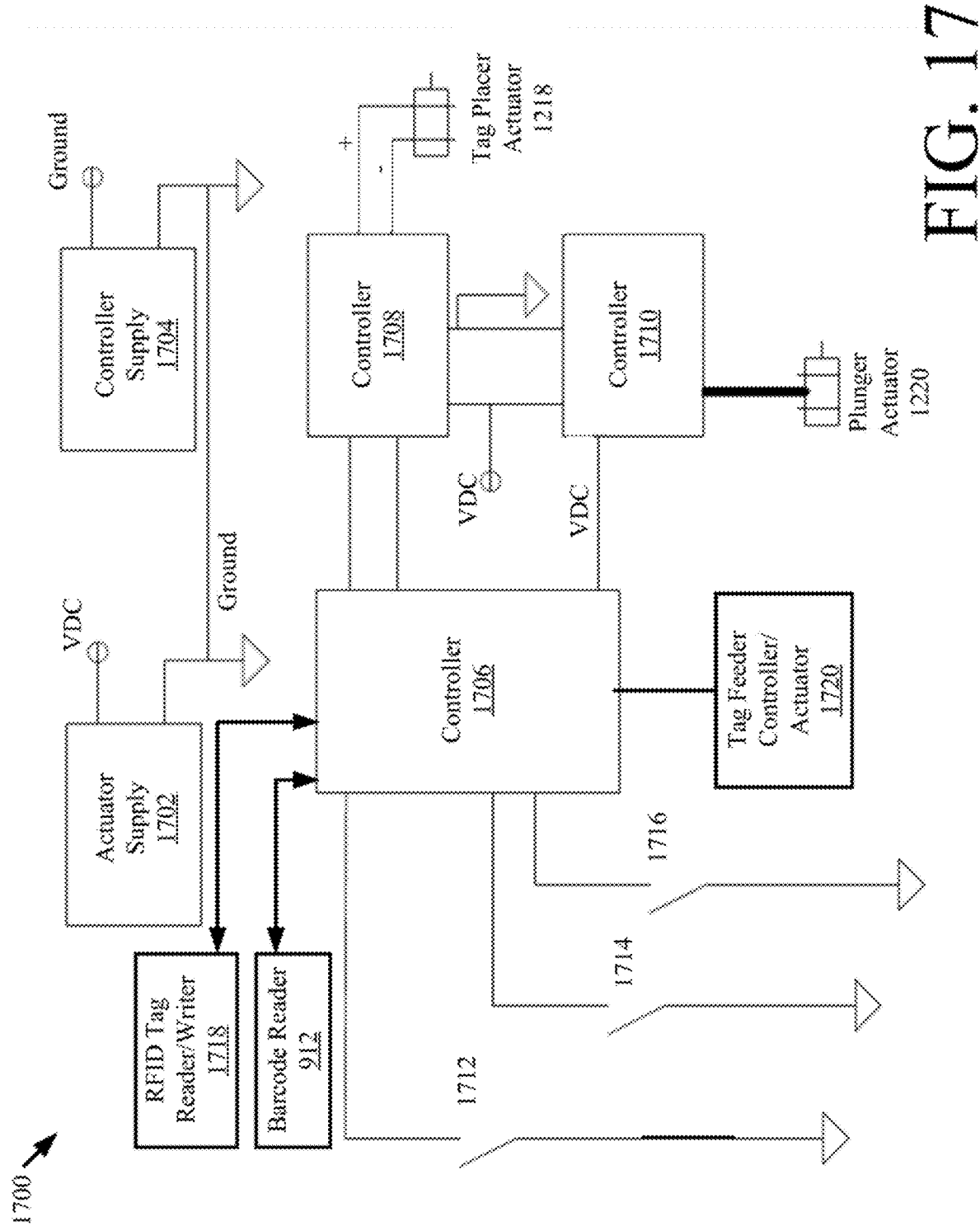
FIG. 17 is a circuit diagram of at least a portion of internal electronics of the tag applicator shown in FIGS. 9-16.

Referring now to FIG. 17, there is provided a diagram of at least some of the internal circuit 1700 of the tag applicator 900. The tag applicator 900 can include more or less components than that shown in FIG. 19. In some scenarios, the tag applicator 900 includes the same or similar architecture as that shown in FIG. 6 for base 104.

As shown in FIG. 17, circuit 1700 comprises an actuator supply 1702, a controller supply 1704, controllers 1706-1710, switches 1712-1716, an RFID tag reader/writer 1718, and a barcode reader 912. The actuator supply 1702 supplies power to the linear feed actuator 1218 and the plunger actuator 1220. The controller supply 1704 supplies power to the controller(s) 1706, 1708, 1710, RFID tag reader/writer 1718, and/or barcode reader 912.

Controller 1706 is configured to receive feedback information when switches 1712, 1714 and/or 1716 are closed. The feedback information can include, but is not limited to, sensor data indicating whether the tag is properly disposed in the nest 908, sensor data indicating whether an item is properly located in the insert space 910, and/or data indicating that a user is requesting initialization of tag application operations. The sensor data can be generated by a proximity sensor (e.g., a push button, a beam break sensor, etc.), a foot pedal, and/or a palm valve. The feedback information is then processed by the controller 1706 to determine whether the tag application operations should be initiated. For example, the controller 1706 causes initiation of the tag application operations when (1) the tag is properly disposed in the nest 908, (2) an item is properly located in the insert space 910, and (3) a user request has been received. The present solution is not limited to the particulars of this example. More or less information can be used by the controller to make such a determination regarding performance of the tag application operations.

The tag application operations involve: instructing a tag feeder controller/actuator 1720 to energize the rotation mechanism 1208 such that the tag feeder 902 is rotated whereby a tag becomes aligned with the cavity 1206; instructing controller 1708 to cause the linear feedback actuator 1218 to be energized at a given time and/or for a given period of time; instructing the controller 1710 to cause the plunger actuator 1220 to be energized at a given time and/or for a given period of time.

Figure 21:
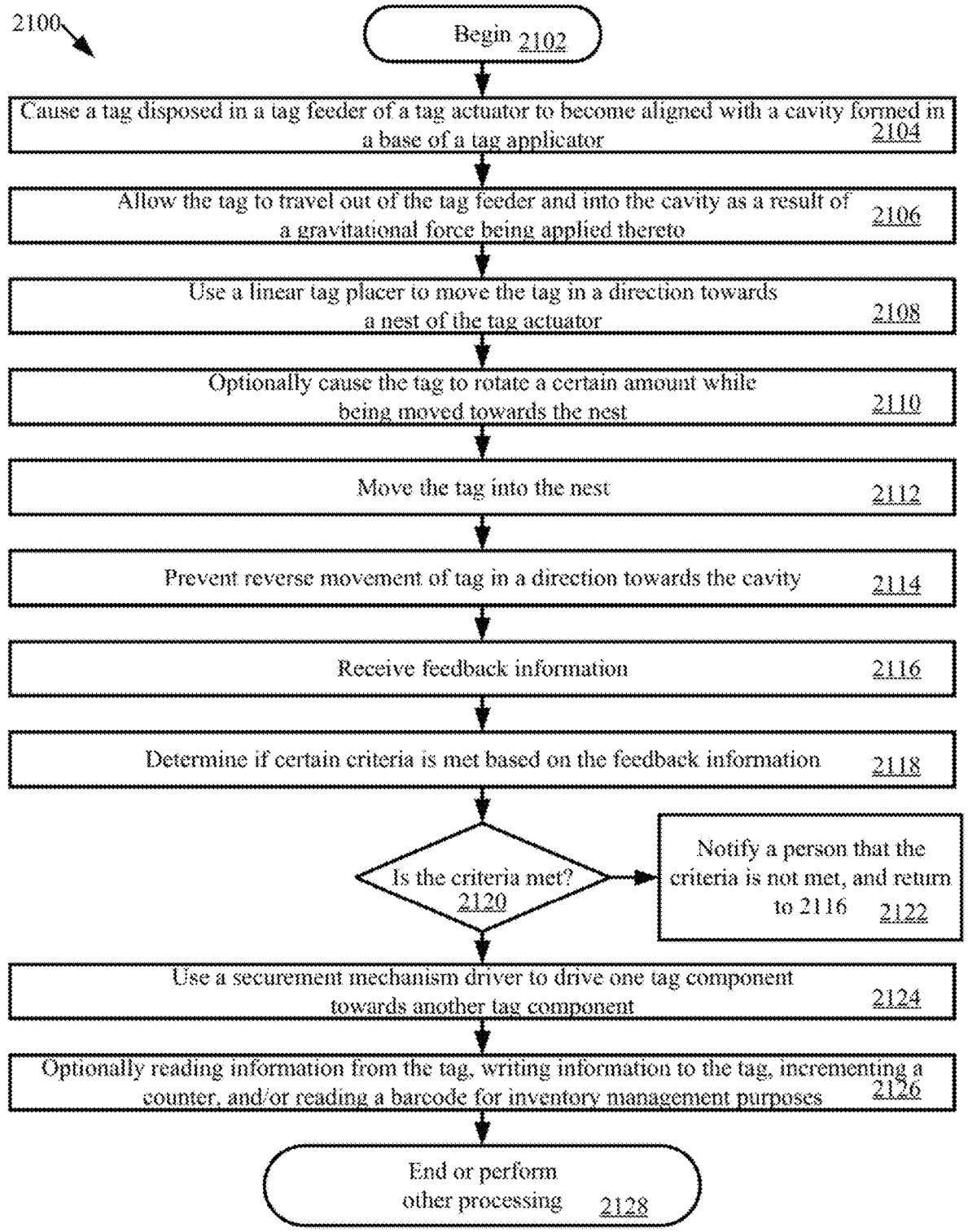
FIG. 21 is a flow diagram of an illustrative method for coupling a tag to an item using a tag applicator.

Referring now to FIG. 21, there is provided a flow diagram of an illustrative method 2100 for coupling a tag (e.g., tag 110 of FIG. 1 or tag 906 of FIG. 9) to an item using a tag applicator (e.g., tag applicator 100 of FIG. 1 or tag applicator 900 of FIGS. 9-17). Method 2100 begins with 2102 and continues with 2104 where the tag is caused to become aligned with a cavity (e.g., cavity 1206 of FIG. 12) formed in a base (e.g., base 904 of FIG. 9) of the tag applicator. In some scenarios, this alignment is achieved by (a) inserting the tag feeder (e.g., tag feeder 102 of FIG. 1) into a cavity (e.g., cavity 112 of FIG. 1) formed in the tag applicator's base (e.g., base 104 of FIG. 1) and/or (b) rotating a tag feeder (e.g., tag feeder 902 of FIG. 9) in a clockwise or counterclockwise direction.

Next in 2106, the tag is allowed to travel out of the tag feeder and into the cavity (e.g., cavity 1206 of FIG. 12) as a result of a gravitational force being applied thereto. In some scenarios, 2106 involves moving a structure (e.g., a plate or door) that is obstructing the cavity opening such that the tag is now able to drop into the cavity.

In 2108, a linear tag placer (e.g., linear tag placer 1216 of FIG. 12) is used to move the tag in a direction (e.g., direction 1218 of FIG. 12) towards a nest (e.g., nest 908 of FIG. 9) of the tag applicator. As the tag is being moved towards the nest, it is optionally caused to rotate a certain amount (e.g., ninety degrees). In some scenarios, this rotation is achieved using a guide (e.g., guide 1224 of FIG. 12) with a curved surface (e.g., surface 1222 of FIG. 12) against which a portion of the tag (e.g., the tag's actuator 1902 of FIG. 19) is slid.

The tag is then moved into the nest as shown by 2112. Once the tag is fully disposed in the nest, it is prevented from any reverse movement in a direction towards the cavity, as shown by 2114. For example, a stop (e.g., stop 1212 of FIG. 12) of the tag applicator engages the tag so as to prevent such reverse movement.

In 2116, the tag applicator receives feedback information. The feedback information includes information that is useful for making a determination as to whether or not a given criteria is met. Accordingly, the feedback information includes, but is not limited to, sensor data indicating whether the tag is properly disposed in the nest (e.g., nest 908 of FIG. 9) of the tag applicator, sensor data indicating whether an item is properly located in the insert space (e.g., insert space 910 of FIG. 9) of the tag applicator, and/or data indicating that a user is requesting initialization of tag application operations.

If a determination is made that the criteria is not met [2120: NO], then 2122 is performed where a person is notified of the same. Method 2100 also returns to 2122.

If a determination is made that the criteria is met [2120: YES], then 2124 is performed where a securement mechanism driver (e.g., securement mechanism driver 636 of FIG. 6 or plunger 1200 of FIG. 12) is used to drive one tag component (e.g., pin 1400 of FIG. 14) towards another tag component (e.g., second housing portion 1906 of FIG. 19). In 2126, various actions can be optionally taken for inventory management purposes. For example, the tag actuator can perform operations to read information from a tag (e.g., a tag identifier), write information to the tag (e.g., item level information such a Universal Product Code ("UPC"), item price and/or item description), incrementing a counter (e.g., indicating that another item of a particular type has a tag coupled thereto and is placed on a store floor), and/or reading a barcode attached to an item to which the tag is coupled. Subsequently, 2128 is performed where method 2100 ends or other processing is performed (e.g., return to 2104).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for coupling a tag to an item, comprising:
engaging a tag with a mechanical stop of a tag applicator that resists movement of the tag away from a nest of the tag applicator subsequent to the tag being moved into the nest;
determining, by the tag applicator, if a criterion is met in the tag applicator; and
coupling, by the tag applicator, the tag to an item placed in an aperture of the tag based on a determination that the criterion is met.

2. The method according to claim 1, wherein coupling the tag to the item comprises moving a plunger along a straight line that is substantially perpendicular to the aperture.

3. The method according to claim 1, further comprising causing the tag to orientate about a horizontal axis while being moved towards the nest such that an orientation of a center axis of the aperture formed in the tag for receiving a pin is aligned with a center axis of a plunger.

4. The method according to claim 3, wherein a portion of the tag slides against a curved surface of a guide that causes orientation of the tag.

5. The method according to claim 1, wherein the criterion comprises feedback information indicating at least one of whether the tag is properly disposed in the nest of the tag applicator, whether an item is properly located in an insert space of the tag applicator, or whether a user is requesting initialization of a tag application operation.

6. The method according to claim 1, further comprising generating a notification based on a determination that the criterion is not met.

7. The method according to claim 1, further comprising maintaining a count of store inventory of tags using, at least in part, the tag applicator.

8. The method according to claim 1, wherein the tag applicator comprises a tag feeder comprising one or a combination of: a linear cartridge; a rotary cartridge; a magazine; a vibratory feeder; or index rotary table.

9. The method according to claim 1, wherein coupling the tag to the item comprises one or more of:
causing a pin to be inserted through the item and into a body of the tag;
causing a first mating tag portion to be moved towards a second mating tag portion; and
causing an engagement member of the tag to rotate until the engagement member contacts a latch or a fastener disposed in the body of the tag.

10. The method according to claim 9, further comprising one or more of:
driving a separate pin through the item and into the body of the tag located above, below or to a side of the item; or
actuating a retractable pin of the tag via one or more of rotation of a knob, depression of a button, or application of a magnetic field to the tag.

11. The method according to claim 1, wherein the mechanical stop is bendable, rotatable or resiliently biased to resist the movement of the tag away from the nest subsequent to the tag being moved into the nest.

12. A tag applicator, comprising:
a mechanical stop configured to engage a tag, the mechanical stop movable relative to the tag, during a first movement of the tag into a nest of the tag applicator, to resist a second movement of the tag away from the nest subsequent to the tag being moved into the nest;
a sensor configured to generate feedback information;
a processor configured to determine if a criterion is met based on the feedback information; and
a securement mechanism configured to couple the tag to an item, wherein the securement mechanism is actuated when a determination is made that the criterion is met.

13. The tag applicator according to claim 12, wherein the securement mechanism comprises a plunger that is movable in along a second line that is perpendicular to a movement of the tag into the nest.

14. The tag applicator according to claim 13, wherein the securement mechanism is further configured to perform one or more of:
cause a pin to be inserted through the item and into a body of the tag,
cause a first mating tag portion to be moved towards a second mating tag portion; and
cause an engagement member of the tag to rotate until the engagement member contacts a latch or a fastener disposed in the body of the tag.

15. The tag applicator according to claim 14, wherein the securement mechanism is further configured to perform one or more of:
drive a separate pin through the item and into the body of the tag located above, below or to a side of the item; or
actuate a retractable pin of the tag via one or more of rotation of a knob, depression of a button, or application of a magnetic field to the tag.

16. The tag applicator according to claim 12, further comprising a guide configured to cause the tag to orientate about a horizontal axis while being mechanically moved towards the nest such that an orientation of a center axis of an elongate aperture formed in the tag is aligned with a center axis of a plunger.

17. The tag applicator according to claim 16, wherein a portion of the tag slides against a curved surface of the guide which causes orientation of the tag.

18. The tag applicator according to claim 12, wherein the feedback information comprises at least one of information indicating whether the tag is properly disposed in the nest of the tag applicator, information indicating whether an item is properly located in an insert space of the tag applicator, or information indicating that a user is requesting initialization of a tag application operation.

19. The tag applicator according to claim 12, wherein the processor is further configured to generate a notification based on a determination that the criterion is not met.

* * * * *